(No Model.)

W. W. COLE.
LUBRICATOR.

No. 348,451. Patented Aug. 31, 1886.

WITNESSES:
Th. Rolle.
A. P. Grant.

INVENTOR:
Wm. W. Cole.
BY John A. Wiedersheim
ATTORNEY.

United States Patent Office.

WILLIAM W. COLE, OF PHILADELPHIA, PENNSYLVANIA.

LUBRICATOR.

SPECIFICATION forming part of Letters Patent No. 348,451, dated August 31, 1886.

Application filed February 13, 1886. Serial No. 191,801. (No model.)

*To all whom it may concern:*

Be it known that I, WILLIAM W. COLE, a citizen of the United States, residing in the city and county of Philadelphia, State of Pennsylvania, have invented a new and useful Improvement in Lubricators, which improvement is fully set forth in the following specification and accompanying drawings, in which—

Figure 1:
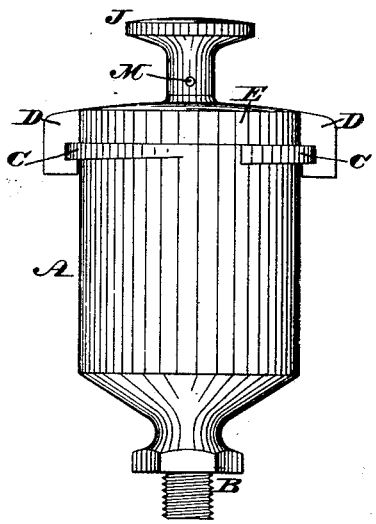
Figure 2:
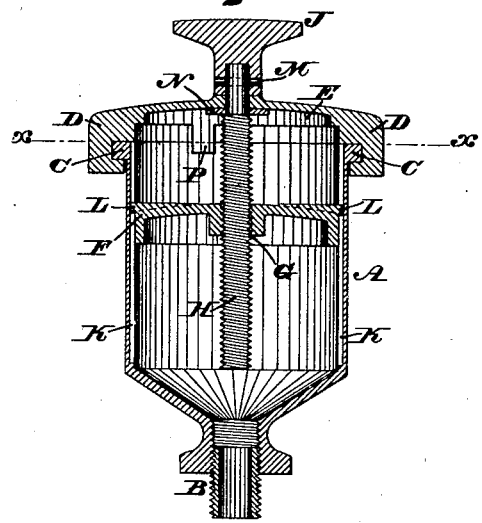
Figure 3:
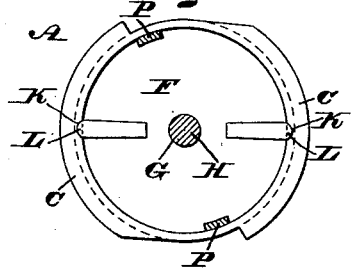

Figure 1 represents a side elevation of a lubricator embodying my invention. Fig. 2 represents a vertical section thereof. Fig. 3 represents a horizontal section in line $x$ $x$, Fig. 2.

Similar letters of reference indicate corresponding parts in the several figures.

My invention consists of a lubricator formed of a cup, a cover, or cap, a follower, and a screw which is fitted to the follower and swiveled to the head, whereby a lubricant, especially of a hard nature, may be readily directed from the cup, and the extent of pressure therein readily adjusted.

Referring to the drawings, A represents the cup for receiving the lubricant, the same having at the bottom a threaded stem, B, whereby it may be screwed to the place of service. On the upper portion of the exterior of the cup are spiral flanges C, with which engage hook-shaped lugs D of the covering-cap E, it being evident that by rotation of the cap in one direction the lugs ride on and engage with the flange, thus tightening the cap on the cup, and by the rotation of the cap in the opposite direction it is loosened and may be removed. Snugly fitted within the cup is a head or follower, F, the center of which has a threaded opening, G, with which engages a screw, H, the upper end whereof is swiveled to the cap E and secured to a button or knob, J, on the top of said cap, whereby the screw may be rotated, the effect whereof is the descent or ascent of the follower, according to the direction of rotation of the screw, by which provision the extent of pressure on the lubricant may be adjusted, the device being especially designed for hard or solid lubricant. As the lubricant is discharged, the screw is occasionally rotated, so as to maintain the proper pressure thereon. On the inner face of the cup are vertical grooves K, and projecting from the periphery of the follower are tongues L, which enter said grooves and prevent rotation of the follower, and consequent rotary compression of the lubricant, packing or clogging of the cup thus being avoided.

In order to connect the screw H with the knob J and form the swivel on the cap E, the upper end of the screw is passed freely through an opening in the cap and inserted in an opening in the knob, and secured thereto by the pin M, or other fastening device. A pin or plate, N, forming a shoulder, is fixed to the screw on the under side of the cap, and thus said shoulder and the knob J retain the screw in position and permit the rotation of the same without capability of rising or falling. In lieu of the pin or plate N, a shoulder may be formed directly on the screw for similar purposes. Projecting downwardly from the rim of the cap are tongues P, which enter the cup and ride on the inner face of the top thereof, serving to locate the cap on the cup and assist in guiding the lugs D to the flanges C when the cap is rotated, and also preventing the cap from dropping from position when unscrewed or loosened from the flanges.

Having thus described my invention, what I claim as new, and desire to secure by Letters Patent, is—

1. A lubricator formed of the cup A, having spiral flanges on its sides and an opening in its bottom provided with a threaded stem, covering-cap E, with tongues P and depending hook-shaped lugs, screw H, the knob J, secured to said screw and adapted to revolve the same, and a follower, all substantially as described.

2. In a lubricator, the covering-cap E, having the screw H detachably swiveled thereto, and tongues P, in combination with a cup having an opening in its bottom with threaded stem, and follower F, with horizontal tongues working in vertical recesses in said cup, all substantially as and for the purpose set forth.

3. The cup with spiral lugs and internal grooves, the cap with lugs, the top knob, the follower with tongues, and the screw, the latter being fitted to the follower connected with the knob and swiveled to the cap, the parts being combined, as stated, and forming an improvement in lubricators.

WM. W. COLE.

Witnesses:
HENRY C. WATT,
JOHN A. WIEDERSHEIM.